US010510468B2

(12) United States Patent
Kibe et al.

(10) Patent No.: US 10,510,468 B2
(45) Date of Patent: Dec. 17, 2019

(54) LAN CABLE

(71) Applicant: Hitachi Metals, Ltd., Tokyo (JP)

(72) Inventors: Tamotsu Kibe, Tokyo (JP); Motoharu Kajiyama, Tokyo (JP); Makoto Iwasaki, Tokyo (JP); Mamoru Ohashi, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/904,938

(22) Filed: Feb. 26, 2018

(65) Prior Publication Data
US 2018/0322986 A1    Nov. 8, 2018

(30) Foreign Application Priority Data

Feb. 24, 2017 (JP) .................................. 2017-033546
May 2, 2017 (JP) .................................. 2017-091501

(51) Int. Cl.
*H01B 7/00* (2006.01)
*H01B 11/06* (2006.01)
(Continued)

(52) U.S. Cl.
CPC ................ *H01B 11/06* (2013.01); *C08J 9/06* (2013.01); *C08L 23/0853* (2013.01); *H01B 3/44* (2013.01);
(Continued)

(58) Field of Classification Search
CPC ... H01B 3/02; H01B 3/04; H01B 7/02; H01B 7/04; H01B 7/17
(Continued)

(56) References Cited

U.S. PATENT DOCUMENTS 5,001,304 A * 3/1991 Hardin ................... G02B 6/443
                                                    174/107
5,358,786 A * 10/1994 Ishikawa .................. H01B 3/30
                                                    174/110 AR
(Continued)

FOREIGN PATENT DOCUMENTS

CN    104200918 A    12/2014
EP    0380244 A1    8/1990
(Continued)

OTHER PUBLICATIONS

Extended European Search Report issued in Application No. 18158668.6, by the European Patent Office, dated Jun. 26, 2018 (9 pages).
Database WPI Week 201511, Dec. 10, 2014, Thomson Scientific, London, GB; AN 2015-08770Q, XP002782057.

*Primary Examiner* — William H. Mayo, III
(74) *Attorney, Agent, or Firm* — Meunier Carlin & Curfman LLC

(57) ABSTRACT

A LAN cable includes a sheath; an electrical wire accommodated in the sheath and including a conductor and an insulating body covering the conductor; and an intermediate layer having a mass reduction rate at 500.degree. C. of less than or equal to 10% by mass and a mass reduction rate at 600.degree. C. of less than or equal to 50% by mass, and located between the sheath and the electrical wire. The insulating body includes polyethylene having a dielectric constant of smaller than or equal to 2.5. The sheath includes a polyolefin-based polymer and a flame retardant, and a content of the flame retardant in the sheath is greater than or equal to 150 parts by mass with respect to 100 parts by mass of the polyolefin-based polymer.

10 Claims, 1 Drawing Sheet

(51) Int. Cl.
*C08J 9/06* (2006.01)
*H01B 3/44* (2006.01)
*H01B 7/295* (2006.01)
*H01B 7/02* (2006.01)
*H01B 7/18* (2006.01)
*H01B 11/00* (2006.01)
*H01B 7/17* (2006.01)
*C08L 23/08* (2006.01)
*C08K 3/22* (2006.01)

(52) U.S. Cl.
CPC ............ *H01B 3/441* (2013.01); *H01B 7/0225* (2013.01); *H01B 7/17* (2013.01); *H01B 7/18* (2013.01); *H01B 7/295* (2013.01); *H01B 11/005* (2013.01); *C08J 2323/06* (2013.01); *C08K 2003/2224* (2013.01)

(58) Field of Classification Search
USPC ........... 174/102 R, 107, 110 R, 113 R, 117 R
See application file for complete search history.

(56) References Cited

U.S. PATENT DOCUMENTS

| | | | | |
|---|---|---|---|---|
| 6,255,594 | B1* | 7/2001 | Hudson | H01B 7/295 174/121 A |
| 2003/0070831 | A1* | 4/2003 | Hudson | H01B 7/295 174/113 R |
| 2011/0079427 | A1* | 4/2011 | Powale | H01B 3/427 174/72 A |
| 2012/0224818 | A1* | 9/2012 | Karayianni | C08K 5/0066 385/100 |
| 2012/0318557 | A1* | 12/2012 | Iwasaki | C08K 5/0025 174/113 C |
| 2014/0141240 | A1* | 5/2014 | Segawa | H01B 3/30 428/375 |
| 2016/0185944 | A1* | 6/2016 | Oriani | C08L 77/02 524/186 |

FOREIGN PATENT DOCUMENTS

| | | |
|---|---|---|
| EP | 0410621 A1 | 1/1991 |
| JP | 2015004025 A | 1/2015 |

* cited by examiner

LAN CABLE

CROSS-REFERENCE TO RELATED APPLICATIONS

This application claims the benefit of Japanese Patent Application No. 2017-33546 filed Feb. 24, 2017 and No. 2017-091501 filed May 2, 2017 in the Japan Patent Office, the entire disclosures of which are incorporated herein by reference.

BACKGROUND

The present disclosure relates to a local area network (LAN) cable.

The LAN cable is used for a local area network (LAN) construction. The LAN cable includes a sheath, and an electrical wire accommodated in the sheath and coated with an insulating body (see Japanese Unexamined Patent Publication No. 2015-4025). Ethylene-vinyl acetate copolymer (EVA) in which vinyl acetate (VA) amount is greater than or equal to 20% is generally known as the material of the sheath.

SUMMARY

Flame retardancy is required for the LAN cable. In particular, to comply with the overseas standards, high flame retardancy is required for the LAN cable. In order to enhance the flame retardancy of the LAN cable, a flame retardant is mixed in the sheath. However, if the flame retardant of an amount sufficient to give an adequate flame retardancy is mixed in the sheath having the EVA as a main component, the stretch/elasticity of the sheath under low temperature lowers.

In one aspect of the present disclosure, it is preferable to provide a LAN cable in which the flame retardancy is high and the stretch/elasticity under low temperature is large.

One aspect of the present disclosure relates to a LAN cable that comprises a sheath; an electrical wire accommodated in the sheath and comprising a conductor and an insulating body covering the conductor; and an intermediate layer having a mass reduction rate at 500° C. of less than or equal to 10% by mass and a mass reduction rate at 600° C. of less than or equal to 50% by mass, and located between the sheath and the electrical wire, wherein the insulating body comprises polyethylene having a dielectric constant of smaller than or equal to 2.5, the sheath comprises polyolefin-based polymer and a flame retardant, and a content of the flame retardant in the sheath is greater than or equal to 150 parts by mass with respect to 100 parts by mass of the polyolefin-based polymer.

BRIEF DESCRIPTION OF THE DRAWINGS

An embodiment of the present disclosure will be described hereinafter by way of example with reference to the accompanying drawing, in which.

DETAILED DESCRIPTION OF THE PREFERRED EMBODIMENTS

1. Configuration of LAN Cable

Figure 1:
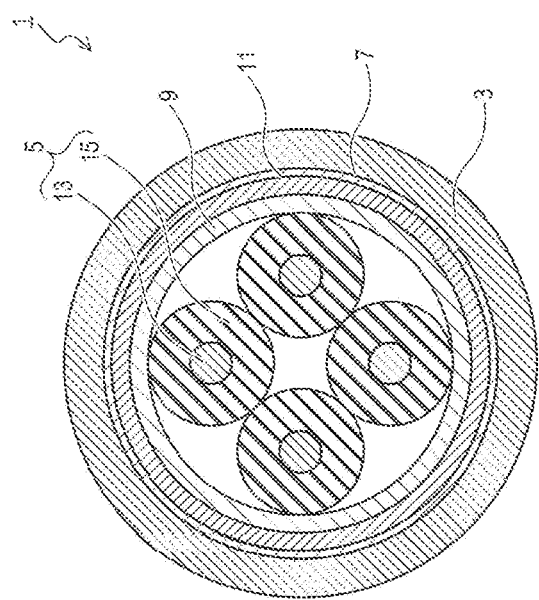
FIG. 1 is a cross-sectional view showing a configuration of a LAN cable 1.

A LAN cable in the embodiment of the present disclosure comprises: a sheath and an electrical wire accommodated in the sheath. The electric wire comprises a conductor and an insulating body coating the conductor. An intermediate layer is located between the sheath and the electrical wire. The intermediate layer has a mass reduction rate at 500° C. of smaller than or equal to 10% by mass, and a mass reduction rate at 600° C. of smaller than or equal to 50% by mass. The insulating body comprises polyethylene having a dielectric constant of less than or equal to 2.5. The sheath contains greater than or equal to 150 parts by mass of flame retardant with respect to 100 parts by mass of polyolefin-based polymer. The LAN cable of the present disclosure has high flame retardancy and large stretch under low temperature.

In the LAN cable of the present disclosure, the insulating body comprises flammable polyethylene. Even if the sheath is configured to be difficult to burn, the insulating body is easy to burn. Therefore, it is difficult to improve flame retardancy of the entire cable. This is considered because combustible gas generated from the insulating body at the time of burning the LAN cable breaks a sheath shell and leaks to a combustion field.

In the present disclosure, an intermediate layer is arranged between the insulating body and the sheath. Since the intermediate layer has a low mass reduction rate at high temperature, its shape can be maintained even at high temperature. The intermediate layer maintains the shape even at high temperature at the time of burning, and suppresses leaking of flammable gas originating from the insulating body to outside, thereby improving flame retardancy of the LAN cable. Also, the intermediate layer becomes easy to burn in the presence of oxygen, and shape holding performance is deteriorated. Therefore, by forming a sheath shell and steaming in the absence of oxygen in the intermediate layer, deterioration of shape holding performance of the intermediate layer is suppressed.

That is, arrangement of the intermediate layer that maintains its shape even at the time of burning on the insulating body enhances flame retardancy of the LAN cable.

The shape of the intermediate layer can be maintained by the sheath serving as a shell at the time of burning and the internal intermediate layer being steamed. It is preferable that the LAN cable of the present disclosure has an intermediate layer having a low mass reduction rate at high temperature arranged on the insulating body and the sheath covering the intermediate layer. It is further preferable that the LAN cable of the present disclosure has a film as an intermediate layer having a low mass reduction rate at high temperature on the insulating body and the sheath covering the film.

In addition, even when the addition amount of a flame retardant is large, elongation at low temperature tends to decrease.

Therefore, by setting a flame retardant to 150 parts by mass or more, preferably 150 to 250 parts by mass, with respect to 100 parts by mass of polyolefin-based polymer, elongation at low temperature of the sheath and the LAN cable is increased.

2. Sheath

The sheath contains 100 parts by mass of polyolefin-based polymer and greater than or equal to 150 parts by mass of flame retardant. The polyolefin-based polymer is the base polymer of the sheath. Examples of the polyolefin-based polymer include low density polyethylene (LDPE), linear low density polyethylene (LLDPE), linear very-low density polyethylene (VLDPE), high density polyethylene (HDPE), polypropylene (PP), ethylene-ethyl acrylate copolymer (EEA), ethylene-vinyl acetate copolymer (EVA), ethylene-styrene copolymer, ethylene-glycidyl methacrylate copolymer, ethylene-butene-1 copolymer, ethylene-butene-hexene ternary copolymer, ethylene propylene-diene ternary copolymer (EPDM), ethylene-octene copolymer (EOR), ethylene copolymer polypropylene, ethylene-propylene copolymer (EPR), poly-4-methyl-pentene-1, maleic-acid graft low density polyethylene, hydrogenated styrene-butadiene copolymer (H-SBR), maleic-acid graft linear low density polyethylene, copolymer of ethylene and a olefin having a carbon number of 4 to 20, ethylene-styrene copolymer, maleic-acid graft ethylene-methyl acrylate copolymer, maleic-acid graft ethylene-vinyl acetate copolymer, ethylene-maleic anhydride copolymer, ethylene-ethyl acrylate-maleic anhydride ternary copolymer, ethylene-propylene-butene-1 ternary copolymer having butene-1 as a main component, and the like. The polyolefin-based polymer is preferably EVA, and is particularly preferably EVA having a VA (vinyl acetate) amount of 20% to 50%. One of the types of EVA may be used alone, or two or more types of EVA may be blended and used for the polyolefin-based polymer.

If polyolefin-based polymer used for the sheath is, for example, an ethylene-vinyl acetate copolymer (EVA), the larger the amount of VA (vinyl acetate) is, the higher the glass transition temperature of EVA is, and various properties such as elongation at low temperature, tend to be deteriorated. Thus, EVA is preferably having a VA (vinyl acetate) amount of 20% to 50%.

It is preferable that acid-modified polyolefin is used as the polyolefin-based polymer used for the sheath. It is preferable that the acid-modified polyolefin is used with EVA. It is further preferable that glass transition temperature of the acid-modified polyolefin is −55° C. or less, more preferably in a range of −70° C. to −55° C. In this case, elongation of the sheath and the LAN cable at low temperature is further improved.

Examples of the acid-modified polyolefin used for the sheath may include maleic acid modified polyolefin, maleic acid grafted low density polyethylene, maleic acid grafted linear low density polyethylene, maleic acid grafted ethylene-methyl acrylate copolymer, maleic acid grafted ethylene-vinyl acetate copolymer, ethylene-maleic anhydride copolymer, and ethylene-ethyl acrylate-maleic anhydride terpolymer. In this case, the elongation property of the sheath and the LAN cable at low temperature is further improved.

Examples of the flame retardant include metallic hydroxide such as magnesium hydroxide, aluminum hydroxide, and calcium hydroxide; amorphous silica; zinc compound such as zinc stannate, hydroxy zinc stannate, zinc borate, and zinc oxide; boric acid compound such as calcium borate, barium borate, and barium metaborate; phosphorous flame retardant; nitrogen flame retardant such as melamine cyanurate; intumescent flame retardant including a mixture of a component that foams and a component that solidifies at the time of burning; and the like. The flame retardant is preferably a metallic hydroxide, and is particularly preferably a magnesium hydroxide. When the flame retardant contains magnesium hydroxide and/or aluminum hydroxide, the flame retardancy of the LAN cable is further enhanced.

One of the types of flame retardant described above may be used alone or two or more types may be blended and used. For example, magnesium hydroxide and aluminum hydroxide may be blended and used. The flame retardant may be surface-treated by silane coupling agent, titanate coupling agent, fatty acid such as stearic acid and calcium stearate, fatty acid metallic salt, or the like.

In the present embodiment, the content of the flame retardant in the sheath is greater than or equal to 150 parts by mass with respect to 100 parts by mass of polyolefin-based polymer. The flame retardancy of the LAN cable is enhanced since the content of the flame retardant is greater than or equal to 150 parts by mass. An upper limit value in the content of the flame retardant is not particularly limited, but is preferably smaller than or equal to 250 parts by mass with respect to 100 parts by mass of polyolefin-based polymer. The stretch of the sheath under low temperature can be increased by reducing the content of the flame retardant.

The sheath may further contain additives such as antioxidant, metal deactivator, cross linking agent, cross linking auxiliary agent, lubricant, inorganic filler, compatibilizing agent, stabilizing agent, carbon black, and coloring agent, as necessary. Furthermore, the sheath may be cross-linked by an organic peroxide, or may be cross-linked by radiation such as an electron beam.

The antioxidant is not particularly limited, but examples thereof include phenol-based, sulfur-based, amine-based, phosphorus-based antioxidant, and the like. The phenol-based antioxidant is not particularly limited, but examples thereof include dibutylhydroxytoluene (BHT), pentaerythritol tetrakis [3-(3,5-di-t-butyl-4-hydroxyphenyl) propionate], 1,3,5-tris(3,5-di-t-butyl-4-hydroxy-benzyl)-S-triazine-2,4,6-(1H,3H,5H) trion, tiodiethylenebis [3-(3,5-di-tert-butyl-4-hydroxyphenyl)propionate], and the like, and pentaerythritol tetrakis [3-(3,5-di-t-butyl-4-hydroxyphenyl) propionate] is more suitable.

The sulfur-based antioxidant is not particularly limited, but examples thereof include didodecyl 3,3'-thiodipropionate, ditridecyl 3,3'-thiodipropionate, dioctadecyl 3,3'-thiodipropionate, tetrakis [methylene-3-(dodecylthio) propionate] methane, and the like, and tetrakis [methylene-3-(dodecylthio) propionate] methane is more suitable. One of the types of such antioxidants described above may be used alone or two or more types may be blended and used.

The metal deactivator has an effect of stabilizing a metal ion by chelate formation, and suppressing oxidation degradation. The structure of the metal deactivator is not particularly limited, but examples thereof include N-(2H-1,2,4-triazol-5-yl) salicylamide, dodecanedioic acid bis[N2-(2-hydroxybenzoyl)hydrazide, 2', 3-bis[[3-[3,5-di-tert-butyl-4-hydroxyphenyl]propionyl]] propionohydrazide, and the like, and 2', 3-bis[[3-[3,5-di-tert-butyl-4-hydroxyphenyl]propionyl]] propionohydrazide is more suitable.

The cross-linking auxiliary agent is not particularly limited but examples thereof include trimethylol propane trimethacrylate (TMPT), triallyl isocyanurate (TAIC), and the like.

The lubricant is not particularly limited but examples thereof include fatty acid, fatty acid metallic salt, fatty acid amide, and the like, and zinc stearate is specifically exemplified. One of the types of such lubricants described above may be used alone or two or more types may be blended and used.

The carbon black is not particularly limited, but examples thereof include rubber carbon black (N900-N100: ASTM D 1765-01), and the like. The coloring agent is not particularly limited, but examples thereof include a non-halogen color master batch, and the like.

3. Electrical Wire

The electrical wire is accommodated in the sheath. Furthermore, the electrical wire comprises a conductor and an insulating body coating the conductor. The conductor is preferably a copper conductor. The copper conductor is preferably plated, and a tinned copper conductor, for example, is preferable. The insulating body comprises polyethylene having a dielectric constant of smaller than or equal to 2.5. If the dielectric constant of the polyethylene is smaller than or equal to 2.5, then a capacitance of the insulating body becomes small. The transmission property of the LAN cable is thus further enhanced. The dielectric constant of the entire insulating body is preferably less than or equal to 2.5. In this case, the transmission property of the LAN cable is further enhanced.

The polyethylene is not particularly limited as long as the dielectric constant is smaller than or equal to 2.5, and examples thereof include low density polyethylene (LDPE), linear low density polyethylene (LLDPE), linear very-low density polyethylene (VLDPE), high density polyethylene (HDPE), and the like. Low density polyethylene is more suitable, and low density polyethylene having a density of smaller than or equal to 0.930 g/cm$^3$ and a melt flow rate (MFR) of smaller than or equal to 0.30 g/10 minutes is particularly suitable. One of the types of polyethylene described above may be used alone or two or more types may be blended and used.

The insulating body may further comprise an antioxidant, a copper inhibitor, a coloring agent, and the like. The content of the antioxidant, the copper inhibitor, the coloring agent, and the like is not particularly limited, but a content with which the dielectric constant of the entire insulating body becomes smaller than or equal to 2.5 is preferred. The content of the coloring agent, and the like is preferably smaller than or equal to 5% by mass, and more preferably smaller than or equal to 2% by mass.

The polyethylene may be foamed using a known method. For example, the polyethylene may be foamed through a method using an inert gas such as nitrogen, or using a chemical foaming agent such as Azodicarbonamide (ADCA). When the polyethylene is foamed, the flame retardancy of the LAN cable is further enhanced. The extent of foaming of the polyethylene is preferably greater than or equal to 15% by mass. When the extent of foaming of the polyethylene is greater than or equal to 15%, the flame retardancy of the LAN cable is further enhanced.

4. Intermediate Layer

The intermediate layer is arranged between the sheath and the electrical wire. The intermediate layer has a mass reduction rate at 500° C. of smaller than or equal to 10% by mass, and a mass reduction rate at 600° C. of smaller than or equal to 50% by mass. The mass reduction rate of the intermediate layer is a value that is obtained by a calculation formula below by using a mass value (X) of the intermediate layer measured when the temperature is raised to a specified temperature (500° C., 600° C.) under a condition of temperature rising rate of 10° C./min. in a dry air atmosphere using a differential scanning calorimeter (DSC), and a mass value (Y) of the intermediate layer before the temperature is raised.

Mass reduction rate (%)=100×(Y−X)/Y

The flame retardancy of the LAN cable is further enhanced by arranging the intermediate layer having the property described above.

Examples of the material of the intermediate layer include metal, organic matter, and the like. If the organic matter is used for the material of the intermediate layer, the flexibility of the LAN cable can be further enhanced. Examples of the organic matter include polyimide, an organic matter containing mica, and the like, but polyimide is preferable. When the intermediate layer contains polyimide, the flexibility of the LAN cable is further enhanced.

The position of the intermediate layer in the LAN cable can be appropriately selected, but is preferably a position immediately under the sheath, and more preferably on an inner surface side of the sheath and contacting the inner surface of the sheath. When located at a position immediately under the sheath, the intermediate layer is less likely to influence the dielectric property of the electrical wire.

Examples of the mode of the intermediate layer include a mode of being configured by winding a film. The intermediate layer may be configured by winding a plurality of films at a plurality of locations. The winding method of the film is not particularly limited, and examples thereof include lateral winding, longitudinal attachment, and the like. If the winding method of the film is lateral winding, the flexibility of the LAN cable can be further enhanced. In the case of the lateral winding, for example, the winding can be carried out while overlapping a portion of a defined width in the film. The amount of overlap is preferably greater than or equal to ¼ of the circumference.

EXAMPLE

The following various LAN cables (S1-S10, and R1-R4) were prepared and tested. The results are summarized in Tables 1-3 below.

(1) Manufacturing of LAN Cable 1

FIG. 1 shows a configuration of a LAN cable 1. The LAN cable 1 comprises a sheath 3, an electrical wire 5, an intermediate layer 7, an aluminum laminate PET tape 9, and a copper braid 11. The electrical wire 5 is accommodated in the sheath 3. The electrical wire 5 comprises a tinned copper conductor 13 located at the center of the electrical wire 5, and an insulating body 15 located on the outer periphery of the tinned copper conductor 13. In other words, the electrical wire 5 is coated with the insulating body 15. The intermediate layer 7 is arranged between the sheath 3 and the electrical wire 5. The aluminum laminate PET tape 9 and the copper braid 11 are located between the electrical wire 5 and the intermediate layer 7.

The manufacturing method of each LAN cable 1 is as described below. First, the materials of the insulating body, the intermediate layer, and the sheath were prepared. The materials of the insulating body were low density polyethylene (LDPE), ethylene-vinyl acetate copolymer (EVA), and antioxidant. The LDPE had a density of 0.924 g/cm$^3$ and an MFR of 0.23 g/10 minutes. The EVA had a vinyl acetate content (EV) of 33%, an MFR of 1.0 g/10 minutes. The antioxidant was a phenol antioxidant (ADK STAB AO-18 manufactured by ADEKA).

The insulating body was caused to foam by a chemical foaming method using a foaming agent. The dielectric constant of insulating body was measured by a cavity resonant perturbation method.

For the intermediate layer, a polyimide film and a PET film each having a thickness of 0.025 mm and a width of 15 mm were used. The polyimide film had a mass reduction rate at 500° C. of 1% by mass and a mass reduction rate at 600° C. of 26% by mass. The PET film had a mass reduction rate at 500° C. of 100% by mass and a mass reduction rate at 600° C. of 100% by mass. The polyimide film was Kapton 200H (manufactured by Du Pont-Toray Co., Ltd.).

For the sheath, a polyolefin-based polymer, a flame retardant, cross linking auxiliary agent, lubricant, antioxidant, and coloring agent were used. As the polyolefin-based polymer, EVA, LDPE, and maleic-acid modified polyolefin A (glass transition temperature Tg: −65° C.) were used. As shown in Table 1 to Table 3, four types of EVA for the sheath different in VA content and MFR (VA content: 17%, MFR: 0.8 g/10 minutes; VA content: 28%, MFR: 6.0 g/10 minutes; VA content: 33%, MFR: 1.0 g/10 minutes; VA content: 46%, MFR: 100 g/10 minutes) were used. The LDPE for the sheath had a density of 0.924 g/cm$^3$ and MFR of 0.23 g/10 minutes. The maleic-acid modified polyolefin A was TAFMER MH7020 (manufactured by Mitsui Chemicals, Inc.).

For the flame retardant, two types of magnesium hydroxide (I, II) were used. The magnesium hydroxide (I) was silane treated magnesium hydroxide (MAGNIFIN H10A manufactured by Albemarle Co.). The magnesium hydroxide (I) was magnesium hydroxide treated with fatty acid (MAGNIFIN H10A manufactured by Albemarle Co.).

The cross linking auxiliary agent was polyfunctional methacrylate, and the polyfunctional methacrylate was trimethylol propane trimethacrylate (TMPT: manufactured by Shin-Nakamura Chemical Co., Ltd.). The lubricant was zinc stearate (Nitto Chemical Industry Co., Ltd.). The antioxidant was a phenol antioxidant (ADK STAB AO-18 manufactured by ADEKA). The coloring agent was carbon black (Asahi Thermal, FT<Fine Thermal>) manufactured by Asahi Carbon Co., Ltd.

As shown in Table 1 to Table 3, compounding ratios of the insulating body and the sheath as well as the number of films as the intermediate layer were changed variously to obtain fourteen types of LAN cables, which were named as S1 to S10 and R1 to R4. The unit of the compounding amount in Table 1 to Table 3 is parts by mass. In Table 1 to Table 3, the compounding ingredients of the insulating body 15, the compounding ingredients of the sheath 3, the type of film, and the number of films in each LAN cable 1 are shown.

With such compounding ratios, a pellet obtained by kneading at a starting temperature of 40° C. and a finishing temperature of 190° C. with a pressurizing kneader was used for the materials of the insulating body and the sheath.

Next, the tinned copper conductor 13 having an outer diameter of 0.78 mm was coated with the material of the insulating body described above to a thickness of 0.4 mm, and then cross-linked with an exposure dose of 7 MRad to manufacture the electrical wire 5.

Next, four of electrical wires 5 were twisted, and the aluminum laminate PET tape 9 was wound by ¼ lap thereon. The copper braid 11 was then placed thereover. The polyimide tape was then laterally wound by ¼ lap to form the intermediate layer 7. The material of the sheath was then coated onto the intermediate layer 7 to a thickness of 1.1 mm, and irradiated and cross-linked with an exposure dose of 13 MRad to manufacture the LAN cable 1.

However, the intermediate layer 7 was not formed in R2 indicated in Table 3. Furthermore, a PET film was used in place of the polyimide tape in R4.

TABLE 1

| | Material | Composition | S1 | S2 | S3 | S4 | S5 |
|---|---|---|---|---|---|---|---|
| Compounding ingredient of insulating body | Polymer | LDPE | Density 0.924, MFR 0.23 | 100 | 100 | 100 | 100 | 100 |
| | | EVA | VA amount 33%, MFR 1.0 | | | | | |
| | Antioxidant | | ADK STAB AO-18 (manufactured by ADEKA Co.) | 0.5 | 0.5 | 0.5 | 0.5 | 0.5 |
| | | | Extent of foaming (%) of insulating body | 0 | 15 | 30 | 0 | 15 |
| | | | Dielectric constant of insulating body | 2.3 | 2.1 | 1.9 | 2.3 | 2.1 |
| Film | | | Polyimide film | One | One | One | Two | One |
| | | | (Thickness 0.025 mm, width 15 mm, ¼ lap) | | | | | |
| Compounding ingredient of sheath | Polymer | EVA | VA amount 17%, MFR 0.8 | | | | | |
| | | EVA | VA amount 28%, MFR 6.0 | 60 | 60 | 60 | 60 | 60 |
| | | EVA | VA amount 33%, MFR 1.0 | 10 | 10 | 10 | 10 | 10 |
| | | EVA | VA amount 46%, MFR 100 | 10 | 10 | 10 | 10 | 10 |
| | | LDPE | Density 0.924, MFR 0.23 | | | | | |
| | | | Maleic-acid modified polyolefin A (Tg: −65) | 20 | 20 | 20 | 20 | 20 |
| | Flame retardant | | Magnesium hydroxide (I) | 70 | 70 | 70 | 70 | 60 |
| | | | Magnesium hydroxide (II) | 110 | 110 | 110 | 110 | 90 |
| | Cross-linking auxiliary agent | | TMPT (manufactured by Shin-Nakamura Chemical Co., Ltd.) | 4 | 4 | 4 | 4 | 4 |
| | Lubricant | | Zinc stearate (manufactured by Nitto Kasei Co., Ltd.) | 1 | 1 | 1 | 1 | 1 |
| | Antioxidant | | ADK STAB AO-18 (manufactured by ADEKA Co.) | 1 | 1 | 1 | 1 | 1 |
| | Coloring agent | | FT carbon | 2 | 2 | 2 | 2 | 2 |
| Sheath property | Tensile test | Tensile strength (MPa) | | ◯ 12.6 | ◯ 12.6 | ◯ 12.3 | ◯ 12.7 | ◯ 11 |
| | | Stretch (%) | | ◯ 150 | ◯ 150 | ◯ 150 | ◯ 150 | ◯ 230 |
| | | Low temperature performance test | | ◯ | ◯ | ◯ | ◯ | ◯ |
| LAN cable property | | Low temperature performance test | | ◯ | ◯ | ◯ | ◯ | ◯ |
| | | Flame retardancy test | | ◯ | ◎ | ◎ | ◎ | ◯ |
| | Transmission property | Capacitance | | ◯ | ◯ | ◯ | ◯ | ◯ |
| | | Determination | | ◯ | ◯ | ◯ | ◯ | ◯ |

TABLE 2

| | | Material | Composition | S6 | S7 | S8 | S9 | S10 |
|---|---|---|---|---|---|---|---|---|
| Compounding ingredient of insulating body | Polymer | LDPE | Density 0.924, MFR 0.23 | 100 | 100 | 100 | 100 | 100 |
| | | EVA | VA amount 33%, MFR 1.0 | | | | | |
| | Antioxidant | ADK STAB AO-18 (manufactured by ADEKA Co.) | | 0.5 | 0.5 | 0.5 | 0.5 | 0.5 |
| | | Extent of foaming (%) of insulating body | | 15 | 15 | 0 | 0 | 0 |
| | | Dielectric constant of insulating body | | 2.1 | 2.1 | 2.3 | 2.3 | 2.3 |
| Film | | Polyimide film (Thickness 0.025 mm, width 15 mm, ¼ lap) | | One | One | One | One | One |
| Compounding ingredient of sheath | Polymer | EVA | VA amount 17%, MFR 0.8 | | | 60 | | |
| | | EVA | VA amount 28%, MFR 6.0 | 60 | 60 | | 10 | 60 |
| | | EVA | VA amount 33%, MFR 1.0 | 10 | 10 | 10 | 60 | |
| | | EVA | VA amount 46%, MFR 100 | 10 | 10 | 10 | 10 | 10 |
| | | LDPE | Density 0.924, MFR 0.23 | | | | | 10 |
| | | Maleic-acid modified polyolefin A (Tg: −65) | | 20 | 20 | 20 | 20 | 20 |
| | Flame retardant | Magnesium hydroxide (I) | | 80 | 90 | 70 | 70 | 70 |
| | | Magnesium hydroxide (II) | | 120 | 130 | 110 | 110 | 110 |
| | Cross-linking auxiliary agent | TMPT (manufactured by Shin-Nakamura Chemical Co., Ltd.) | | 4 | 4 | 4 | 4 | 4 |
| | Lubricant | Zinc stearate (manufactured by Nitto Kasei Co., Ltd.) | | 1 | 1 | 1 | 1 | 1 |
| | Antioxidant | ADK STAB AO-18 (manufactured by ADEKA Co.) | | 1 | 1 | 1 | 1 | 1 |
| | Coloring agent | FT carbon | | 2 | 2 | 2 | 2 | 2 |
| Sheath property | Tensile test | Tensile strength (MPa) | | ◯ 13.2 | ◯ 13.6 | ◯ 14.2 | ◯ 13 | ◯ 12.1 |
| | | Stretch (%) | | ◯ 140 | ◯ 130 | ◯ 140 | ◯ 150 | ◯ 170 |
| LAN cable property | | Low temperature performance test | | ◯ | ◯ | ◯ | ◯ | ◯ |
| | | Low temperature performance test | | ◯ | ◯ | ◯ | ◯ | ◯ |
| | | Flame retardancy test | | ◎ | ◎ | ◯ | ◯ | ◯ |
| | Transmission property | Capacitance | | ◯ | ◯ | ◯ | ◯ | ◯ |
| | | Determination | | ◯ | ◯ | ◯ | ◯ | ◯ |

TABLE 3

| | | Material | Composition | R1 | R2 | R3 | R4 |
|---|---|---|---|---|---|---|---|
| Compounding ingredient of insulating body | Polymer | LDPE | Density 0.924, MFR 0.23 | 0 | 100 | 100 | 100 |
| | | EVA | VA amount 33%, MFR 1.0 | 100 | | | |
| | Antioxidant | ADK STAB AO-18 (manufactured by ADEKA Co.) | | 0.5 | 0.5 | 0.5 | 0.5 |
| | | Extent of foaming (%) of insulating body | | 0 | 0 | 0 | 0 |
| | | Dielectric constant of insulating body | | 2.3 | 2.3 | 2.3 | 2.3 |
| Film | | Polyimide film (Thickness 0.025 mm, width 15 mm, ¼ lap) | | One | None | One | None |
| | | PET film (Thickness 0.025 mm, width 15 mm, ¼ lap) | | | | | One |
| Compounding ingredient of sheath | Polymer | EVA | VA amount 17%, MFR 0.8 | | | | |
| | | EVA | VA amount 28%, MFR 6.0 | 60 | 60 | 60 | 60 |
| | | EVA | VA amount 33%, MFR 1.0 | 10 | 10 | 10 | 10 |
| | | EVA | VA amount 46%, MFR 100 | 10 | 10 | 10 | 10 |
| | | LDPE | Density 0.924, MFR 0.23 | | | | |
| | | Maleic-acid modified polyolefin A (Tg: −65) | | 20 | 20 | 20 | 20 |
| | Flame retardant | Magnesium hydroxide (I) | | 70 | 70 | 50 | 70 |
| | | Magnesium hydroxide (II) | | 110 | 110 | 80 | 110 |
| | Cross-linking auxiliary agent | TMPT (manufactured by Shin-Nakamura Chemical Co., Ltd.) | | 4 | 4 | 4 | 4 |
| | Lubricant | Zinc stearate (manufactured by Nitto Kasei Co., Ltd.) | | 1 | 1 | 1 | 1 |
| | Antioxidant | ADK STAB AO-18 (manufactured by ADEKA Co.) | | 1 | 1 | 1 | 1 |
| | Coloring agent | FT carbon | | 2 | 2 | 2 | 2 |
| Sheath property | Tensile test | Tensile strength (MPa) | | ◯ 12.6 | ◯ 12.6 | ◯ 10.3 | ◯ 12.2 |
| | | Stretch (%) | | ◯ 150 | ◯ 150 | ◯ 280 | ◯ 160 |
| | | Low temperature performance test | | ◯ | ◯ | ◯ | ◯ |

TABLE 3-continued

| Material | | Composition | R1 | R2 | R3 | R4 |
|---|---|---|---|---|---|---|
| LAN cable property | Low temperature performance test | | ○ | ○ | ○ | ○ |
| | Flame retardancy test | | ○ | X | X | X |
| | Transmission property | Capacitance | X | ○ | ○ | ○ |
| | Determination | | X | X | X | X |

(2) Test of Sheath Property

The following tests were conducted for each of S1 to S10 and R1 to R4.

(2-1) Tensile Tests of Sheath (Tensile Strength in MPa, and Stretch in %)

Only the sheath was stripped off from the LAN cable, and the sheath was punched out to a size 6 dumbbell test piece. Next, using the test piece, the tensile test was conducted under a condition in which the tensile speed is 200 mm/min. in compliance with JIS C 3005. With regards to the stretch, × (failed) was marked if the stretch of the test piece was smaller than 125%, and ○ (passed) was marked if the stretch of the test piece was greater than or equal to 125%.

With regards to the tensile strength, × (failed) was marked if the tensile strength of the test piece was smaller than 10 MPa, and ○ (passed with tolerance) was marked if the tensile strength was greater than or equal to 10 MPa. The test results are shown in Table 1 to Table 3. All samples passed these sheath tensile tests.

(2-2) Low Temperature Performance Test of Sheath

Each test piece used in a low temperature performance test of the sheath was obtained similarly to the test piece in the tensile test. Using the test piece, the tensile test was conducted under a condition in which the tensile speed was 25 mm/min. at −55° C. in compliance with EN60811-1-4. ○ (passed) was marked if the stretch property was greater than or equal to 30%, and × (failed) was marked if the stretch of the test piece was smaller than 30%. The test results are shown in Table 1 to Table 3. All samples passed these sheath low temperature performance tests.

(3) Test of LAN Cable Property

The following tests were conducted for each of S1 to S10 and R1 to R4.

(3-1) Low Temperature Performance Test of LAN Cable

The bending test was conducted at −55° C. for the LAN cable in compliance with EN60811-1-4 8.1. ○ (passed) was marked if no crack was formed in the LAN cable after the winding, and × (failed) was marked if a crack was formed in the LAN cable after the winding. The test results are shown in Table 1 to Table 3. All samples passed this test.

(3-2) Flame Retardancy Test of LAN Cable

The VTFT test was conducted for the LAN cable in compliance with the IEEE standard 1202. ○ (passed) was marked if the damage distance of the LAN cable was smaller than or equal to 1.5 m and greater than 1.0 m, and ⊚ (passed with good tolerance, or strongly passed) was marked if the damage distance was smaller than or equal to 1.0 m, and × (failed) was marked if the damage distance was greater than 1.5 m. The test results are shown in Table 1 to Table 3. Samples R2, R3, and R4 failed this flame retardancy test.

(3-3) Transmission Property Test of LAN Cable

The capacitance of the LAN cable was measured in compliance with JIS X 5150 and TIA-568-C.2. ○ (passed) was marked if the capacitance of the LAN cable was smaller than or equal to 5.6 nF/100 m, and × (failed) was marked if the capacitance of the LAN cable was greater than 5.6 nF/100 m. The test results are shown in Table 1 to Table 3. Sample R1 failed this transmission property (capacitance) test.

(4) Test Results

The test results of S1 to S10 were satisfactory for all the test items. In S2 and S3, in particular, the flame retardancy was higher because the insulating body was foamed. In S4, the flame retardancy was higher because the number of polyimide films was two. In S5 to S7, the flame retardancy tended to be higher as the content of the flame retardant in the sheath 3 was greater.

In R1, the capacitance was large and the test result of the transmission property was ×. The reason for this is assumed to be because the dielectric constant of the insulating body 15 is large. In R2, the test result of the flame retardancy was ×. The reason for this is assumed to be because the intermediate layer 7 is not arranged. In R3, the test result of the flame retardancy was ×. The reason for this is assumed to be because the content of the flame retardant is small. In R4, the test result of the flame retardancy was ×. The reason for this is assumed to be because the mass reduction rate of the PET film used to form the intermediate layer 7 is large.

OTHER EMBODIMENTS

The embodiment of the present disclosure has been described, but the present disclosure is not limited to the embodiment described above, and various modifications can be made.

(1) The mode of the LAN cable may be, for example, a duplex insulating body structure or other structures.

(2) The function of one constituent in each embodiment described above may be divided among a plurality of constituents, and the functions of the plurality of constituents may be fulfilled by one constituent. Furthermore, one part of the configuration of each embodiment described above may be omitted. Moreover, at least one part of the configuration of each embodiment described above may be added, replaced, and the like with respect to the other configurations of the embodiment described above. Various modes included in the technical idea specified by the Claims are to be considered as the embodiment of the present disclosure.

(3) In addition to the LAN cable described above, the present disclosure can also be realized in various modes such as the manufacturing method of the LAN cable.

What is claimed is:

1. A LAN cable comprising:
   a sheath;
   an electrical wire accommodated in the sheath and comprising a conductor and an insulating body covering the conductor; and
   an intermediate layer having a mass reduction rate at 500° C. of less than or equal to 10% by mass and a mass reduction rate at 600° C. of less than or equal to 50% by mass, and located between the sheath and the electrical wire, wherein the insulating body comprises polyethylene having a dielectric constant of smaller than or equal to 2.5, wherein the sheath comprises a polyolefin-based polymer and a flame retardant, wherein a content of the flame retardant in the sheath is greater than or equal to 150 parts by mass with respect to 100 parts by mass of the polyolefin-based polymer, wherein the intermediate layer comprises polyimide, and wherein the electrical wire is arranged at a center of the LAN cable and is coated with an aluminum laminate PET tape, a copper braid, the intermediate layer, and the sheath in this order radially outward.

2. The LAN cable according to claim 1, wherein an extent of foaming of the polyethylene contained in the insulating body is greater than or equal to 15%.

3. The LAN cable according to claim 1, wherein the flame retardant is selected from a group consisting of: metallic hydroxides, zinc compounds, boric acid compounds, phosphorous flame retardants, nitrogen flame retardants, and intumescent flame retardants.

4. The LAN cable according to claim 1, wherein the flame retardant comprises magnesium hydroxide and/or aluminum hydroxide.

5. The LAN cable according to claim 1, wherein an extent of foaming of the polyethylene contained in the insulating body is greater than or equal to 15%, and the flame retardant comprises magnesium hydroxide and/or aluminum hydroxide.

6. The LAN cable according to claim 1, wherein the content of the flame retardant in the sheath is greater than or equal to 150 parts by mass and less than or equal to 250 parts by mass with respect to 100 parts by mass of the polyolefin-based polymer.

7. The LAN cable according to claim 1, wherein the intermediate layer is formed by winding a film.

8. The LAN cable according to claim 1, wherein the polyolefin-based polymer comprises ethylene-vinyl acetate copolymer having a VA (vinyl acetate) amount of 20% to 50%.

9. The LAN cable according to claim 8, wherein the polyolefin-based polymer comprises the ethylene-vinyl acetate copolymer and acid-modified polyolefin.

10. The LAN cable according to claim 1, wherein the polyolefin-based polymer used in the sheath comprises acid-modified polyolefin having a glass transition temperature of more than or equal to −70° C. to less than or equal to −55° C.

* * * * *